US008398726B2

(12) United States Patent
Yamagami et al.

(10) Patent No.: US 8,398,726 B2
(45) Date of Patent: Mar. 19, 2013

(54) BATTERY PACK AND METHOD FOR MANUFACTURING THE SAME

(75) Inventors: Sadao Yamagami, Sumoto (JP); Masatsugu Naka, Sumoto (JP); Ryosuke Kubo, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 712 days.

(21) Appl. No.: 11/987,341

(22) Filed: Nov. 29, 2007

(65) Prior Publication Data
US 2008/0131760 A1   Jun. 5, 2008

(30) Foreign Application Priority Data

Nov. 30, 2006 (JP) ................. 2006-324649

(51) Int. Cl.
*B28B 5/00* (2006.01)
*B29C 63/00* (2006.01)
*B29C 65/00* (2006.01)
*B29C 69/00* (2006.01)
*H01M 2/12* (2006.01)
*H01M 4/82* (2006.01)

(52) U.S. Cl. ........ 29/623.2; 29/623.1; 264/241; 429/82; 429/89

(58) Field of Classification Search ............... 429/96, 429/82, 89; 29/623.1, 623.2; 264/241
See application file for complete search history.

(56) References Cited

U.S. PATENT DOCUMENTS

| 2003/0108786 A1* | 6/2003 | Aaltonen et al. ............ 429/61 |
| 2004/0091769 A1* | 5/2004 | Kawabata et al. .......... 429/163 |
| 2005/0053827 A1* | 3/2005 | Watanabe et al. ............ 429/61 |
| 2005/0151514 A1 | 7/2005 | Kozu et al. |

FOREIGN PATENT DOCUMENTS

| JP | 2003-132861 | 5/2003 |
| JP | 2004-6213 | 1/2004 |
| JP | 2004-213931 | 7/2004 |
| JP | 2005-243362 | 9/2005 |
| JP | 2005243362 A * | 9/2005 |
| JP | 2006147329 A * | 6/2006 |

OTHER PUBLICATIONS

Sumida et al., Machine translation of JP 2006147329 A, Jun. 2006.*
Sumida, T., Machine translation of JP 2005-243362 A, Sep. 2005.*

* cited by examiner

*Primary Examiner* — Basia Ridley
*Assistant Examiner* — Sean P Cullen
(74) *Attorney, Agent, or Firm* — Wenderoth, Lind & Ponack, L.L.P.

(57) ABSTRACT

A method including the steps of assembling a battery pack core; holding the core in a mold that forms a molded resin region; closing a cavity of the mold; injecting synthetic resin into the closed cavity; and ejecting the battery pack from the cavity to configure the battery pack with the battery pack core insert-molded in the molded resin region. A projection that protrudes towards an inner surface of the mold cavity is provided on the surface of the insulating cover fixed on the battery. In the resin injection step, the projection on the insulating cover is pressed directly or indirectly by the mold in a direction to put the insulating cover tightly in contact with the surface of the battery; and synthetic resin is injected into the cavity of the mold in this pressed configuration.

11 Claims, 5 Drawing Sheets

BATTERY PACK AND METHOD FOR MANUFACTURING THE SAME

BACKGROUND OF THE INVENTION

1. Field of the Invention

This invention relates to a battery pack and method of manufacture wherein a battery pack core is insert molded into a molded resin region. Specifically, this invention relates to a battery pack and method of manufacture that temporarily holds a battery pack core in a mold that forms the molded resin region, and attaches the molded resin region to the battery in a process step that forms the molded resin region.

2. Description of the Related Art

A prior art battery pack is assembled by inserting a battery pack core, which is an assembly of parts essential to the battery, into a plastic external case. Since a battery pack of this configuration is assembled while inserting and fastening the battery pack core into a fixed position in the external case, its manufacture is difficult. In contrast, a battery pack that does not use an external case has been developed. This type of battery pack is manufactured by insertion of a battery pack core when a molded resin region is formed. The molded resin region is equivalent to the external case. A battery pack with this configuration is manufactured by connecting parts essential to the battery as a battery pack core, temporarily holding the battery pack core in the mold cavity that forms the molded resin region, injecting molten synthetic resin into the mold cavity, and as a result, inserting the battery pack core into the injected synthetic resin. Since the battery can be fixed in place in the battery pack during molded resin region formation, the external case can be omitted and the battery pack can be efficiently manufactured in quantity. The molded resin region not only forms part of the external case of the battery pack, it also serves to solidly attach various parts connected to the battery into a single unit. Consequently, since the battery pack core can be fixed in place when the molded resin region is formed, the battery pack has the characteristic that it can be efficiently and inexpensively manufactured in quantity.

In a battery pack of this configuration, the exhaust outlet of the safety valve provided on the battery is closed off by the molded resin region. Gas discharged from an open safety valve escapes to the outside through gaps formed between the battery and the molded resin region. Accordingly, gaps are generated between the battery and the molded resin region attached to the battery during molding by pressure from gas discharged from the safety valve. In this type of battery pack, when the battery pack core is temporarily held in the mold cavity and molten synthetic resin is injected into the mold cavity, the molten synthetic resin can destroy the safety valve. To prevent this detrimental effect, a battery pack has been developed that forms the molded resin region with the exhaust outlet of the safety valve covered by an insulating cover (see Japanese Patent Laid-Open Publication No. 2004-213931).

SUMMARY OF THE INVENTION

In the battery pack cited in JP Publication 2004-213931, the molded resin region is insert molded with an insulating cover closing off the exhaust outlet of the safety valve. However, even though the battery pack is formed by insert molding the battery in the molded resin region with the insulating cover closing off the exhaust outlet of the safety valve, the safety valve can still be damaged by the molded resin region. This is because insulating cover position can shift during molded resin region formation and it becomes impossible to reliably close off the safety valve exhaust outlet. In addition, the twisting strength of a battery pack with this structure can degrade due to a shift in the position of the insulating cover during molded resin region formation. Twisting strength degradation with the shift in insulating cover position occurs because the insulating cover cannot be inserted in the proper position inside the molded resin region.

The present invention was developed to further resolve these drawbacks. Thus, it is an important object of the present invention to provide a battery pack and method of manufacture that reliably prevents shift in insulating cover position during molded resin region formation and reliably prevents destruction of the safety valve by the molded resin region, and in addition prevents twisting strength degradation by accurately inserting the insulating cover in proper position.

The method of manufacture of the present invention has an assembly step to assemble a battery pack core 10 by layering an insulating cover 4, 54 that covers the exhaust outlet 13 of the safety valve 12 on the battery 2; a holding step to hold the battery pack core 10 in the mold 30 that forms the molded resin region 1; a resin injection step to close the cavity 31 of the mold 30 that holds the battery pack core 10 and inject synthetic resin into the closed cavity 31 of the mold 30; and a mold ejection step to remove the battery pack from the cavity 31 of the mold 30 with the battery pack core 10 insert molded in the molded resin region 1. Further, a projection 15 that protrudes towards an inner surface of the cavity 31 of the mold 30, which forms the molded resin region 1, is provided on the surface of the insulating cover 4, 54 layered on the battery 2. In the resin injection processing step of the method of manufacture, the projection 15 on the insulating cover 4, 54 is pressed directly or indirectly by the mold 30 in a direction putting the insulating cover 4, 54 tightly in contact with the surface of the battery 2, and synthetic resin is injected into the cavity 31 of the mold 30 in this pressed configuration.

The present invention prevents shift in the position of the insulating cover during molded resin region formation, and reliably prevents destruction of the safety valve by the molded resin region. It also inserts the insulating cover in a precise position in the molded resin region to achieve the object of preventing degradation in twisting strength. This is because a projection that protrudes towards an inner surface of the mold cavity, which forms the molded resin region, is provided on the surface of the insulating cover layered on the battery. The battery pack is fabricated by injecting synthetic resin into the mold cavity with the projection pressed by the mold to tightly secure the insulating cover on the surface of the battery. In the battery pack core secured in the mold cavity, the insulating cover is retained in a fixed position by pressure from the mold on the insulating cover projection. With the projection of the insulating cover pressed by the mold, the insulating cover tightly contacts the surface of the battery secured in the mold. The assembly is retained in this configuration while molten synthetic resin is injected into the mold cavity. Therefore, synthetic resin injected into the mold cavity does not shift the position of the insulating cover. In particular, the insulating cover does not become separated from the surface of the battery and molten synthetic resin does not ingress between the insulating cover and the battery. As a result, synthetic resin does not ingress between the insulating cover and the battery, does not ingress into the safety valve exhaust outlet, and does not damage the safety valve.

Since the insulating cover projection is pressed upon by the mold when the battery pack core is secured in the mold cavity, the position of the insulating cover is not shifted by the injected synthetic resin. Therefore, the insulating cover is inserted in a precise position in the molded resin region formed in the mold cavity. A structure that insert molds the insulating cover in a precise position in the molded resin region can improve the twisting strength of the fabricated unit. The reason for this can be understood by assuming an insulating cover is insert molded in a shifted position in the molded resin region and part of the insulating cover is either exposed outside the molded resin region or is extremely close to the surface of the molded resin region. In this situation, the insulating cover will deform to move away from the battery if a twisting force is applied to the battery pack having a locally thinned molded resin region.

In the battery pack core assembly step of the method of manufacture of the present invention, a lead plate 5 can be disposed on the projection 15 of the insulating cover 4, 54 to make a battery pack core 10 that is provided with an insulating cover 4, 54 and lead plates 5. A metal plate provided with an alignment slit 16A for inserting the projection 15 of the insulating cover 4, 54 is used as the lead plate 5. The battery pack core 10 is assembled with the insulating cover projection 15 inserted through the alignment slit 16A of the lead plate 5. In this method, the lead plate 5, which is aligned by the insulating cover 4, 54 disposed in a fixed position, can also be disposed in a fixed position. Consequently, both the insulating cover 4, 54 and the lead plate 5 can be insert molded in precise positions in the molded resin region 1.

Further, in the battery pack core assembly step of the method of manufacture of the present invention, a circuit board 3 can be disposed on the projection 15 of the insulating cover 4, 54. In the resin injection process step, synthetic resin can be injected into the mold cavity 31 with the mold 30 pressing the insulating cover 4, 54 into close contact with the battery surface via the intervening circuit board 3. This method can form the molded resin region 1 with the battery pack core 10 secured in the mold cavity 31 and both the insulating cover 4, 54 and the circuit board 3 retained in precise positions. This is because both the insulating cover 4, 54 and the circuit board 3 are pressed upon by the mold 30 to avoid any shift in position. Consequently, in a battery pack manufactured by this method, both the insulating cover 4, 54 and the circuit board 3 can be insert molded in precise positions in the molded resin region 1.

Further, in the battery pack core assembly step of the method of manufacture of the present invention, a circuit board with a test point established on its surface can be used as the circuit board 3 disposed on the insulating cover 4, 54. The circuit board 3 can be provided with an externally exposed region 3A on its front side opposite a pressure region 3B on its backside. The pressure region 3B presses against the projection 15 of the insulating cover 4, 54, and a test point 18 is provided on the externally exposed region 3A. In the resin injection process step, the externally exposed region 3A of the circuit board 3 is pressed by a securing pin 32 in the mold 30. The securing pin 32 presses the externally exposed region 3A of the circuit board 3 and the pressure region 3B of the circuit board 3 in turn presses the projection 15 of the insulating cover 4, 54. This secures the circuit board 3 and the insulating cover 4, 54 in fixed positions in the mold cavity 31 for molded resin region formation. Here, a test window 19 that opens the externally exposed region 3A to the outside can be formed in the molded resin region 1 by the securing pin 32. In this method, the molded resin region 1 is formed with the battery pack core 10 secured in the mold cavity 31, and the circuit board 3 and the insulating cover 4, 54 held in fixed positions by the securing pin 32. As a result, the circuit board 3 and insulating cover 4, 54 can be insert molded in fixed positions in the molded resin region 1, and a test window 19 to expose the test point 18 to the outside is formed by the securing pin 32 that retains the circuit board 3 and the insulating cover 4, 54 in the fixed positions. Consequently, while insert molding the insulating cover 4, 54 and the circuit board 3 in precise positions, the test window 19 for externally exposing the test point 18 can be formed simultaneously.

The battery pack of the present invention is provided with a battery 2 having a safety valve 12, an insulating cover 4, 54 disposed in a position opposite the exhaust outlet 13 of the safety valve 12 of the battery 2, and a molded resin region 1 attached to the battery 2 while inserting the insulating cover 4, 54. The insulating cover 4, 54 is provided with a projection 15 on its surface that is pressed in a direction towards the surface of the battery 2 by the mold 30, which forms the molded resin region 1. In this battery pack, with the projection 15 pressed by the mold 30 and the battery pack core 10 secured in the mold 30, the insulating cover 4, 54 can be retained in a precise position. As a result, the insulating cover 4, 54 can be inserted in a precise position in the molded resin region 1 formed under these conditions.

The battery pack of the present invention can be provided with a lead plate 5 disposed on the insulating cover 4, 54. The lead plate 5 is provided with an alignment slit 16A to insert the projection 15 of the insulating cover 4, 54. The battery pack can have a configuration that disposes the lead plate 5 on the insulating cover 4, 54 with the projection 15 inserted in the alignment slit 16A. In a battery pack with this configuration, both the insulating cover 4, 54 and the lead plate 5 can be inserted in precise positions in the molded resin region 1.

The battery pack of the present invention can be configured with a circuit board 3 disposed on the projection 15 of the insulating cover 4, 54. In this battery pack configuration, the insulating cover 4, 54 can be retained in a fixed position by pressure from the mold 30 via the circuit board 3. Consequently, both the insulating cover 4, 54 and the circuit board 3 can be insert molded in precise positions in the molded resin region 1.

Further, the battery pack of the present invention can be configured with a circuit board 3 provided with a test point 18 on an externally exposed region 3A of the front surface, which is exposed outside the molded resin region 1. The backside of the externally exposed region 3A of the circuit board 3 can be established as a pressure region 3B that presses the projection 15 of the insulating cover 4, 54. The battery pack can be configured with a test window 19 provided in the molded resin region 1 to expose the test point 18 to the outside at the externally exposed region 3A of the circuit board 3. In this battery pack configuration, the externally exposed region 3A of the circuit board 30 can be pressed by the mold 30 that forms the test window 19, and the projection 15 of the insulating cover 4, 54 can in turn be pressed by the pressure region 3B provided on the backside of the externally exposed region 3A allowing the assembly to be secured in a fixed position. With this configuration, the mold 30 that provides the test window 19 in the molded resin region 1 can dispose both the circuit board 3 and the insulating cover 4, 54 in fixed positions. Consequently, the circuit board 3 and the insulating cover 4, 54 can be inserted in precise positions in the molded resin region 1, and this can be done with the mold 30 that forms a test window 19 in the molded resin region 1 to expose the test point 18 to the outside.

Further, the battery pack of the present invention can have an insulating cover 4, 54 that is a molded plastic piece.

Still further, the battery pack can be configured with a exhaust outlet 13 of the safety valve 12 provided in the sealing cap 11 of the battery 2, and a protruding ridge 14 established around the perimeter of the sealing cap 11. The battery pack can be configured to pressure fit the insulating cover 4, 54 inside the protruding ridge 14. With this structure, the insulating cover 4, 54 can be inserted in the molded resin region 1 in an even more precise position.

Finally, since the insulating cover 4, 54 of the battery pack of the present invention is adhered to the battery 2, the molded resin region 1 can be formed with the insulating cover 4, 54 pressed by the mold 30 to secure it in a fixed position while additionally it is adhered to the battery 2. Therefore, the insulating cover 4, 54 of this battery pack can be inserted in an extremely precise position in the molded resin region 1.

The above and further objects of the present invention as well as the features thereof will become more apparent from the following detailed description to be made in conjunction with the accompanying drawings.

DETAILED DESCRIPTION OF THE PREFERRED EMBODIMENTS

Figure 1:
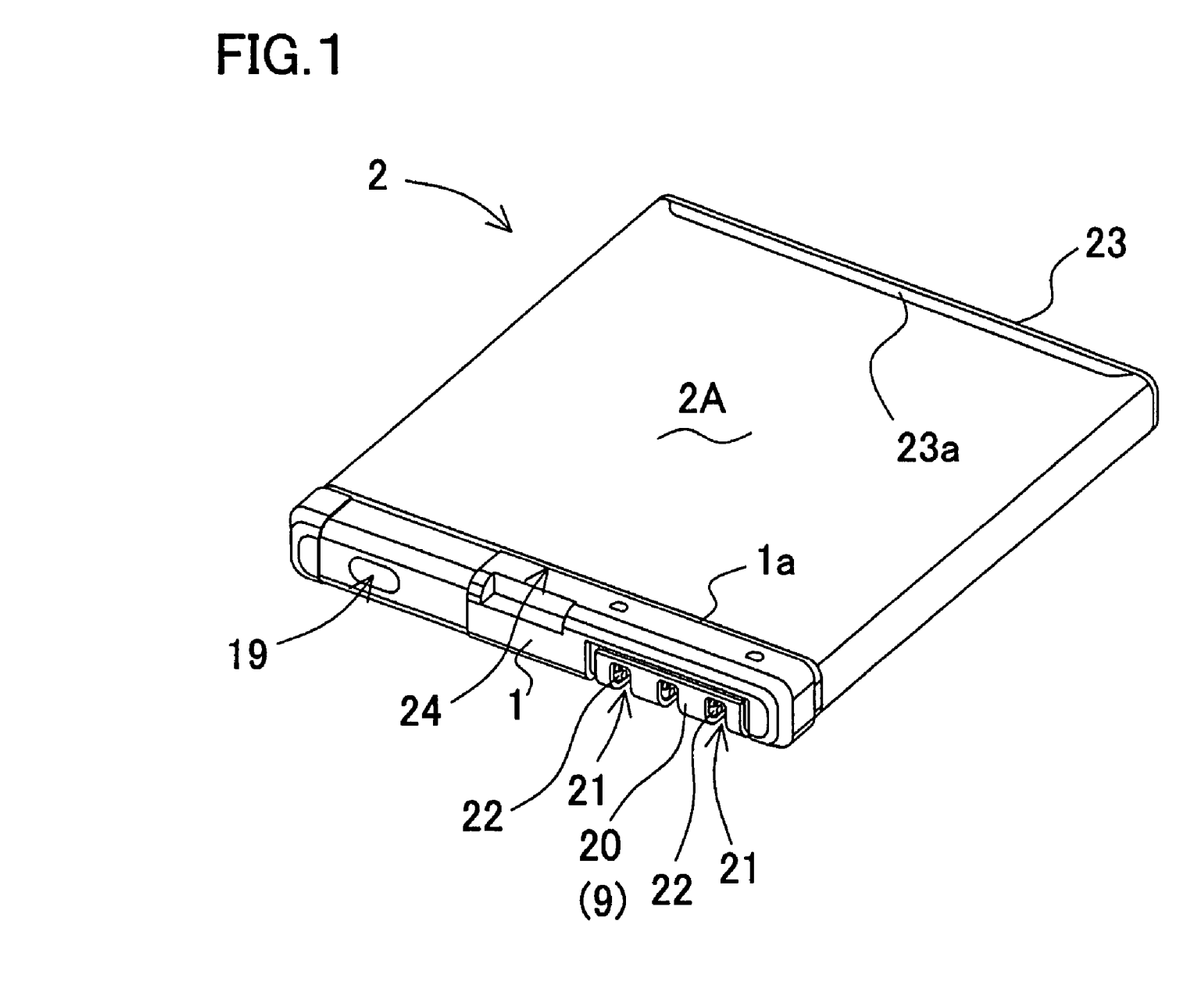
FIG. 1 is a perspective view of a battery pack constructed in accordance with an embodiment of the present invention.
Figure 2:
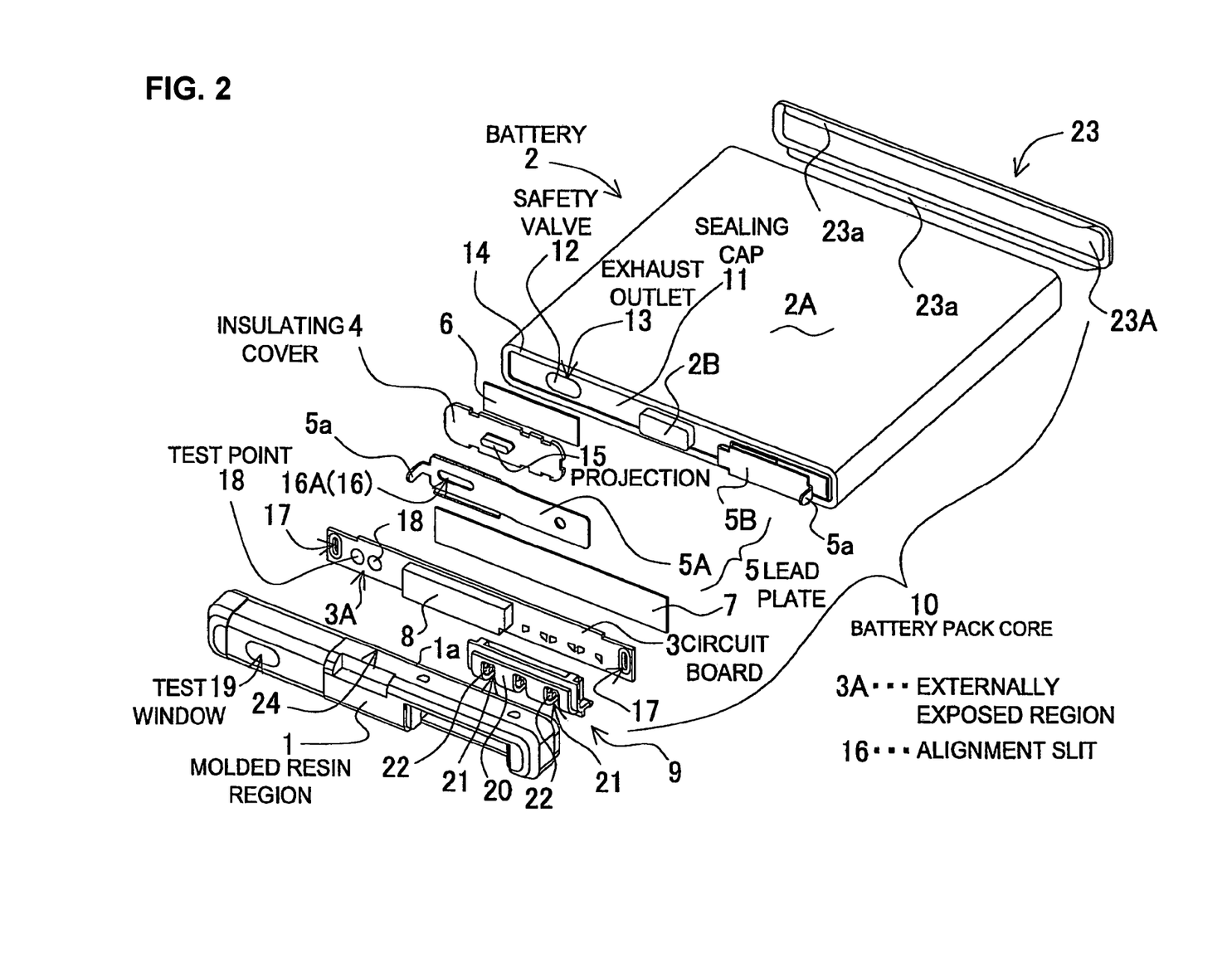
FIG. 2 is an exploded perspective view of the battery pack of FIG. 1.

The battery pack shown in FIGS. 1-4 is manufactured by insert molding a battery pack core 10 in a molded resin region 1. FIG. 2 is an exploded perspective view of the battery pack. FIG. 2 shows the molded resin region 1, the circuit board 3, the lead plates 5, the insulating cover 4 and the battery 2 separately to easily understand each part. In the fabrication process that forms the molded resin region 1, the circuit board 3, lead plates 5, and insulating cover 4 are insert molded in the molded resin region 1 of the battery pack. Therefore, in the molded state, the molded resin region 1 adheres to the battery pack core 10. Although one part of the battery pack core 10 is inserted in the molded resin region 1, the present invention does not limit the part of the battery pack core that is inserted in the molded resin region to the insulating cover, the lead plates, and the circuit board. This is because, although not illustrated, the entire battery pack core can also be inserted in the molded resin region. A battery pack that has one part of the battery pack core 10 inserted in the molded resin region 1 can be made compact overall. A battery pack that has the entire battery pack core inserted in the molded resin region can improve overall durability.

The battery pack has a battery 2 provided with an exhaust outlet 13 of the safety valve 12 in the sealing cap 11, which is the end plane of the battery provided with a protruding electrode 2B. Therefore, the molded resin region 1 is formed to cover the end plane of the battery that is the sealing cap 11. However, in the battery pack of the present invention, a safety valve exhaust outlet can be provided in the end plane opposite the sealing cap, and molded resin region can be attached there. Further, although not illustrated, safety valve exhaust outlets can be provided on both side surfaces of a battery, and the molded resin region can also be established to cover those safety valve opening surfaces.

Figure 4:
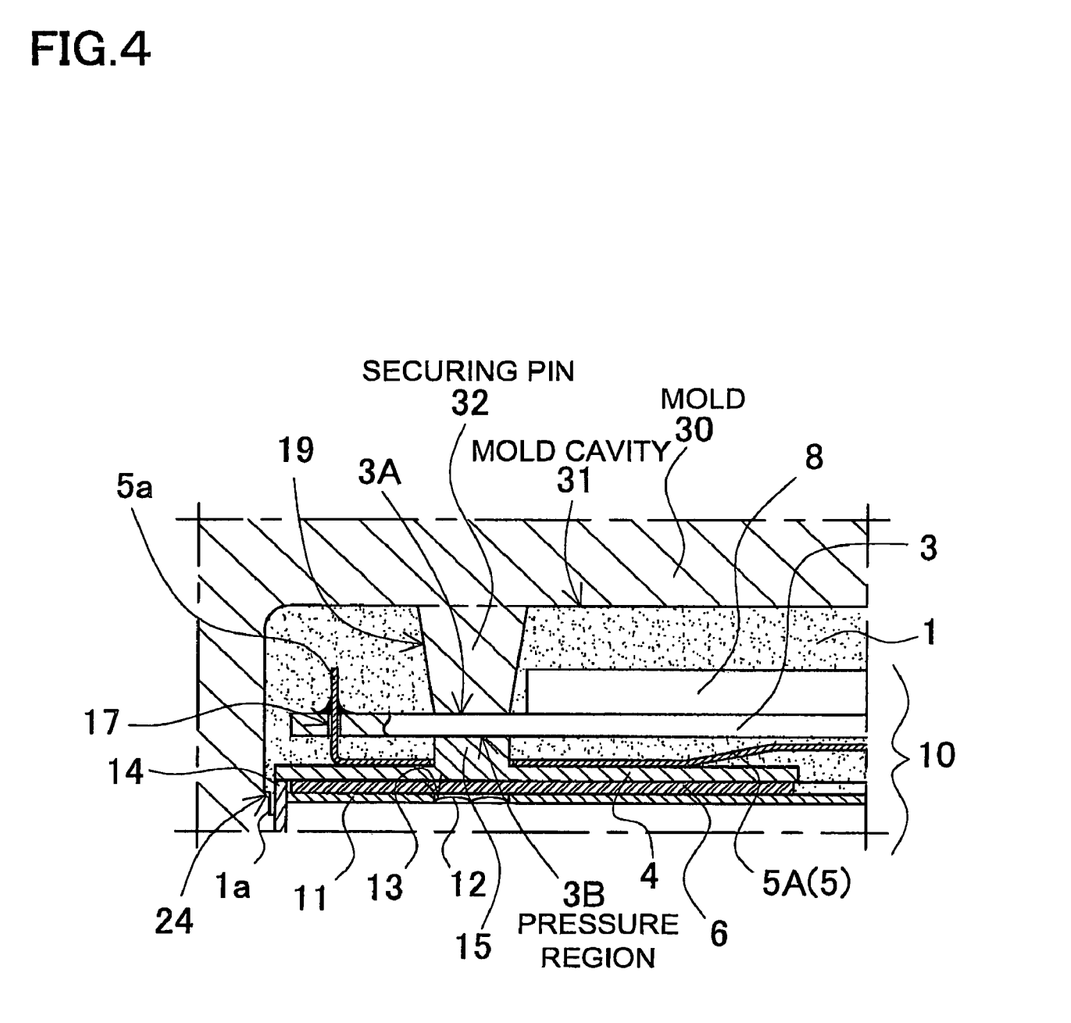
FIG. 4 is a cross-sectional view showing the formation of the molded resin region of a battery pack of an embodiment of the present invention.

As shown in FIG. 4, the battery pack is manufactured by holding the battery pack core 10 inside the cavity 31 of the mold 30, and injecting molten synthetic resin into the mold cavity 31 to insert mold one part of the battery pack core 10 in the molded resin region 1.

The battery pack core 10 is made up of a battery 2, an insulating cover 4 that is disposed in a position opposite the exhaust outlet 13 of the safety valve 12 established on the battery 2 and that also serves to insulate the lead plate 5 from the battery 2, a lead plate 5 disposed on the insulating cover 4, and a circuit board 3 disposed on the lead plates 5 and connected to the lead plates 5.

Figure 3:
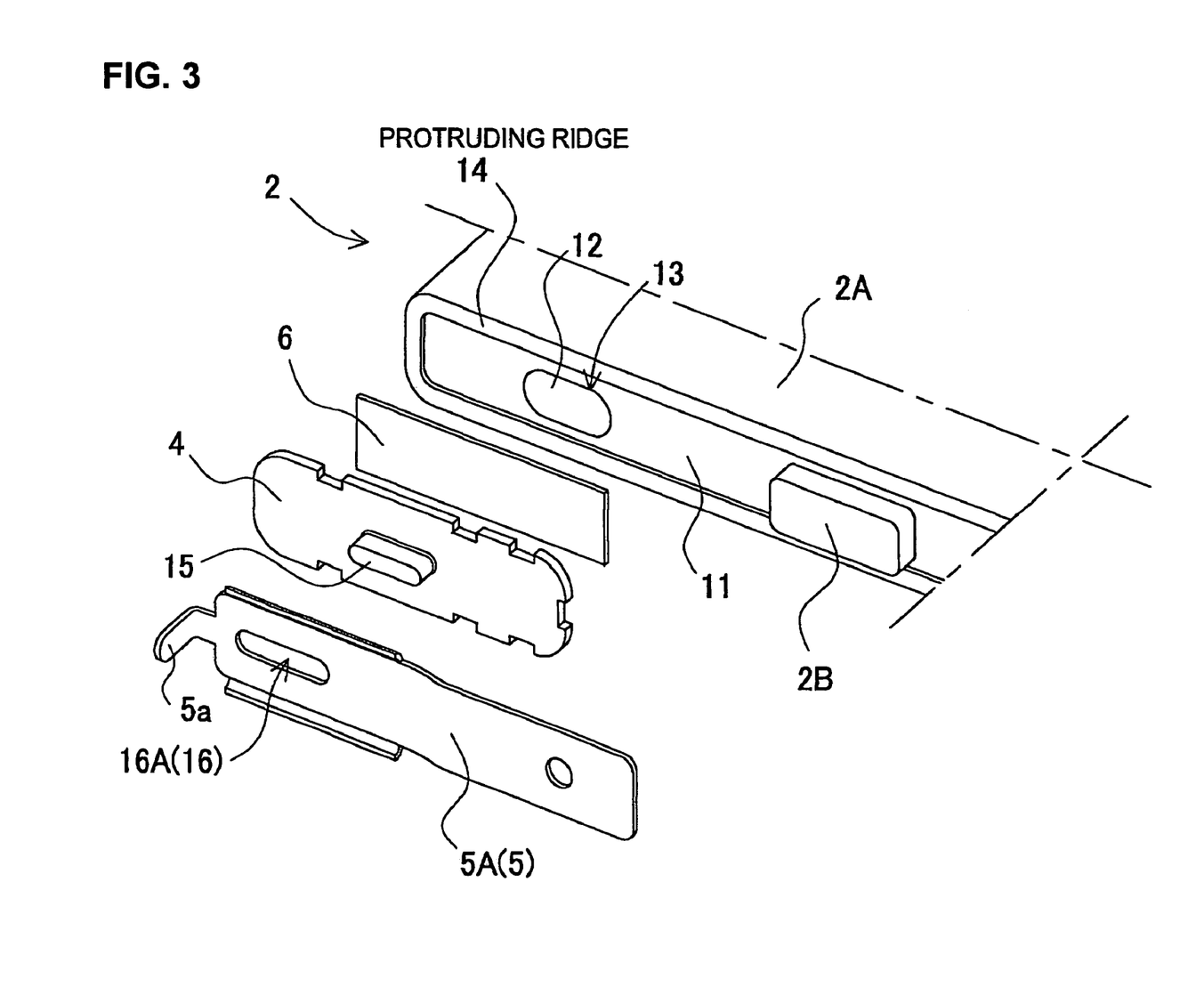
FIG. 3 is an exploded perspective view showing the connecting structure of the battery and the insulating cover of the battery pack shown in FIG. 2.

The battery 2 is a lithium ion battery. However, the battery can be any rechargeable battery such as a nickel hydride battery or nickel cadmium battery instead of a lithium ion battery. In the battery pack, the battery is a thin outline battery. A thin outline battery is shaped with curved surfaces on both sides and the four corner regions of the external case have rounded edges. If a lithium ion battery is used as the thin outline battery, charge capacity can be increased for a given battery pack volume. As shown in FIGS. 2 and 3, the battery 2 is provided with a safety valve 12 on the sealing cap 11, which has the protruding electrode 2B. This battery 2 is provided with a protruding electrode 2B in the center region of the sealing cap 11 and is provided with a safety valve 12 at one end. The safety valve 12 opens when internal battery pressure exceeds a set pressure. In the safety valve 12, the exhaust outlet 13 is covered by a thin membrane that breaks if internal pressure exceeds the set pressure. The thin membrane safety valve 12 has a simple structure, but the insulating cover 4 can deform under the pressure of molded resin region formation and break the membrane. In the battery pack of the present invention, a stiff insulating cover 4 is disposed to cover the exhaust outlet 13 of the safety valve 12, and destruction of the safety valve 12 by synthetic resin pressure during formation of the molded resin region 1 is prevented. However, in the battery pack of the present invention, any configuration of the safety valve that will open when a set pressure is reached can also be used. For example, a safety valve with a flexible piece that elastically presses a valve piece can also be used. If synthetic resin ingresses into the exhaust outlet of this type of safety valve, the valve piece will open and it will not operate properly. A properly operating safety valve will open when internal battery pressure exceeds a set pressure allowing internal gas, etc. to escape and thereby stopping the rise in internal pressure.

Figure 5:
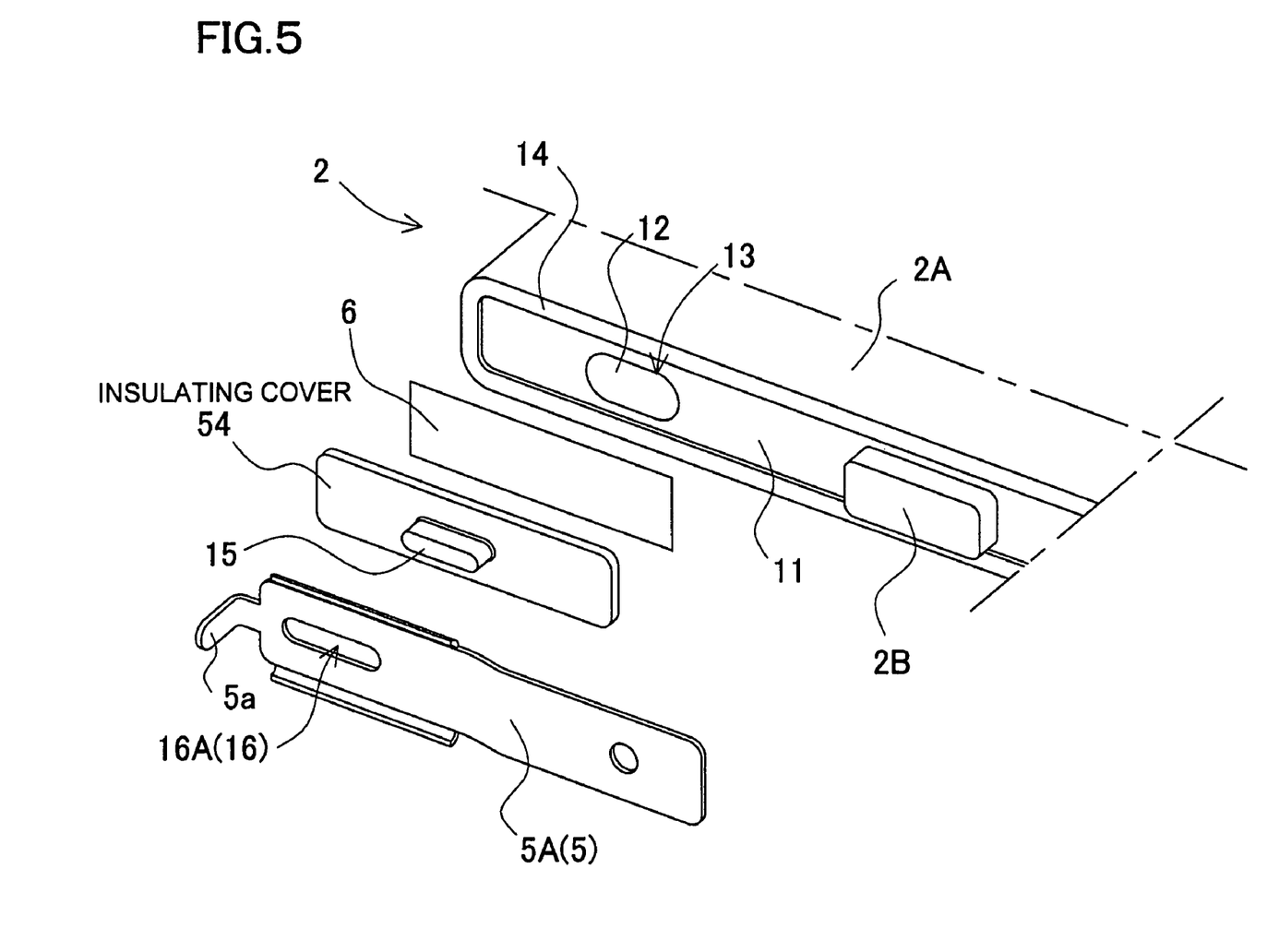
FIG. 5 is an exploded perspective view showing the connecting structure of the battery and the insulating cover of a battery pack of another embodiment of the present invention.

The insulating cover 4 is disposed opposite the exhaust outlet 13 of the safety valve 12 of the battery 2 on the sealing cap 11, which is the surface provided with the opening of the safety valve 12. The insulating cover 4 is shaped with an outline that follows the perimeter of the battery end plane and is formed to fit on one side of that end plane. However, as shown in FIG. 5, the insulating cover can also be shaped with an outline that can be pressure fit inside a protruding ridge 14 provided around the perimeter of the sealing cap 11, and that can fit inside the protruding electrode 2B and the protruding ridge 14. The insulating cover 54 can be pressure fit inside the protruding ridge 14 and disposed in a precise position on the sealing cap 11.

The insulating cover 4 closes off the exhaust outlet 13 of the safety valve 12 during formation of the molded resin region 1, and it is disposed between the lead plate 5 and the sealing cap 11 to insulate the lead plate 5 from the sealing cap 11. The insulating cover 4 is a hard insulating plate that does not deform under the pressure of synthetic resin injected to form the molded resin region 1 with the battery pack core 10 secured in the mold cavity 31. For example, the insulating cover can be a hard synthetic resin plate such as a fiber-glass reinforced epoxy plate, or a phenol plate. However, in the present invention, the insulating cover is not limited to a hard synthetic resin plate and can be any hard plate material that is insulating or has an insulating surface. For example, a metal plate with surfaces covered by an insulating layer, or an inorganic material processed in a plate form can also be used.

As shown in FIG. 4, the insulating cover 4 is provided with a projection 15 on its surface that is pressed upon by a securing pin 32 in the mold 30 that forms the molded resin region 1. The projection 15 extends in a direction towards an inner surface of the mold cavity 31, and is pressed upon by a securing pin 32 provided in the cavity 31 of the mold 30. When the molded resin region 1 is formed, the projection 15 is pressed upon by the securing pin 32 in the closed mold 30 to press the insulating cover 4 into tight contact with the surface of the battery 2. In the battery pack, a circuit board 3 is disposed on the end surface of the insulating cover projection 15. In this battery pack configuration, when molten synthetic resin is injected into the mold cavity 31, the insulating cover projection 15 is pressed by the mold securing pin 32 via the circuit board 3 to urge the insulating cover 4 in a direction to tightly contact the surface of the battery 2. The front side of the circuit board 3 is provided with a test point 18 in an externally exposed region 3A, which is exposed outside the molded resin region 1. On the backside of the externally exposed region 3A of the circuit board 3, a pressure region is established that presses against the projection 15 on the insulating cover 4. In this configuration of the battery pack, the securing pin 32 of the mold 30 presses against the externally exposed region 3A of the circuit board 3, and the pressure region 3B provided on the backside of the externally exposed region 3A presses against the projection 15 on the insulating cover 4 causing a tight connection of the insulating cover 4 to the surface of the battery 2. In particular, this battery pack can dispose both the circuit board 3 and the insulating cover 4 in fixed positions with a mold 30 that establishes a test window 19 in the molded resin region 1 to expose the test point 18 at the externally exposed region 3A of the circuit board 3.

The insulating cover 4, shown in FIGS. 2-4, is provided with a projection 15 that is positioned opposite the exhaust outlet 13 of the safety valve 12. However, the insulating cover projection can also be displaced laterally from the safety valve exhaust outlet and provided in a position that presses against the surface of the sealing cap.

The projection 15 has a lateral cross-sectional shape that is narrow and long in the direction of the long side of the sealing cap 11. The projection 15 presses the insulating cover 4 against the battery sealing cap 11 over a given length and puts the insulating cover 4 in tight contact with the sealing cap 11 over a long area. In addition, a long narrow projection 15 is optimal for insertion through the alignment slit 16A of the lead plate 5. This is because the through-hole 16 provided in the lead plate 5 can be made as a narrow alignment slit 16A. A through-hole 16 provided in the lead plate 5 for inserting the projection 15 increases lead plate 5 electrical resistance and reduces the strength of the lead plate 5. By making the through-hole 16 as a narrow alignment slit 16A, lead plate 5 resistance increases and strength loss can be reduced, and the lead plate 5 and insulating cover 4 can be connected without position shift.

The insulating cover 4 is fixed to the sealing cap 11 via double-sided adhesive tape 6. The double-sided adhesive tape 6 preferably has sufficient thickness to absorb uneven topology in the attachment region. This double-sided adhesive tape 6 can reliably and tightly adhere the insulating cover 4 to the sealing cap 11, which is the surface of the battery 2, and also serves to protect the safety valve 12. When the safety valve 12 opens, the double-sided adhesive tape 6 delaminates and gas escapes to the outside. In a battery pack with the insulating cover 4 adhered to the battery 2, the double-sided adhesive tape 6 prevents a shift in the position of the insulating cover 4 until the battery pack core 10 is secure in the mold 30 and the molded resin region 1 has been formed. Double-sided adhesive tape 6 allows simple attachment of the insulating cover 4 to the surface of the battery. Further, double-sided adhesive tape 6 delaminates quickly with an open safety valve 12, and gas can quickly escape from the open safety valve 12. The insulating cover 4 can also be attached to the battery surface via an adhesive or bond. In the same manner as double-sided adhesive tape, adhesives and bonds are used that have bonding strength allowing them to delaminate when exposed to gas pressure from an open safety valve.

In the battery pack, one end of the lead plate 5A is connected to the protruding electrode 2B of the battery 2. The other end of this lead plate 5A is connected to the circuit board 3. Further, in the battery pack, a lead plate 5B is also connected to the sealing cap 11 of the battery 2 and the other end of this lead plate 5B also connects to the circuit board 3. The circuit board 3 thereby connects to positive and negative electrodes of the battery 2 via the pair of lead plates 5, which is made up of the lead plate 5A connected to the protruding electrode 2B and the lead plate 5B connected to the sealing cap 11. The pair of lead plates 5 is fabricated by cutting sheet metal in the form of a strip of given width. The pair of lead plates 5 joins the circuit board 3 to the battery 2 in a fixed position. The pair of lead plates 5 connects to both ends of the circuit board 3. In a battery pack of this configuration, the circuit board 3 can be joined stably in a fixed position to the battery 2 via the pair of lead plates 5.

The lead plate 5A connected to the protruding electrode 2B is disposed on the insulating cover 4. The insulating cover 4 insulates the lead plate 5A connected to the protruding electrode 2B and prevents it from touching the sealing cap 11. This lead plate 5A is provided with a through-hole 16 for inserting the projection 15 provided on the insulating cover 4. Since the lateral cross-sectional shape of the projection 15 is long and narrow, the through-hole 16 is made as a long, narrow alignment slit 16A. The projection 15 on the insulating cover 4 fits through the alignment slit 16A through-hole 16 to dispose the lead plate 5A on the insulating cover 4 in a fixed position that will not shift. Further, the projection 15 that passes through the through-hole 16 of the lead plate 5A is pressed by a securing pin 32 in the mold 30 without intervention of the lead plate 5A. Since a circuit board 3 is disposed on the projection 15, the insulating cover 4 is pressed by the securing pin 32 via the circuit board 3. The pair of lead plates 5 is connected to the protruding electrode 2B and the sealing cap 11 of the battery 2 by spot welding or laser welding. The lead plates 5 are connected to the circuit board 3 by soldering. The lead plates 5 are provided with connecting pieces 5a that are bent at right angles at the ends of the lead plates 5 and connect with the circuit board 3. The circuit board 3 is provided with through-holes 17 to accept the connecting pieces 5a. The connecting pieces 5a are passed through the through-holes 17 and soldered to connect them to the circuit board 3. In addition, an insulating sheet 7 is disposed between the circuit board 3 and the pair of lead plates 5 connected to the circuit board 3. This insulating sheet 7 prevents the lead plates 5 from touching the circuit board 3.

Protection devices 8 that protect the battery 2 while charging and discharging are mounted on the surface of the circuit board 3, and a connector 9 that becomes the output terminals of the battery pack is fixed to the circuit board 3. The protection devices 8 are elements such as PTC devices or fuses. Protection circuitry (not illustrated) that detects battery voltage and controls charging and discharging is also mounted on the circuit board 3. If the voltage of a discharging battery drops below a minimum voltage or the voltage of a charging battery becomes greater than a maximum voltage, the protection circuitry cuts off the discharging or charging current.

A plurality of flexible contacts 22 that become output terminals are housed in the connector case 20 of the connector 9 attached to the circuit board 3. The connector case 20 is formed from insulating plastic in a shape that mates with an electrical equipment plug (not illustrated). The connector case 20 is provided with three recessed regions 21 that accept the electrical equipment plug and connect in a pressure fit manner. Disposed inside each recessed region 21 is a flexible contact 22 made of flexible sheet metal, and a metal contact on the inserted plug makes electrical contact with that flexible contact 22. The connector 9 is attached to the circuit board 3 and the flexible contacts 22 are electrically connected to the circuit board 3. The circuit board 3, with the connector 9 attached, is insert molded and disposed in a fixed position in the molded resin region 1.

A layer of primer (not illustrated) can be applied to surfaces of the battery pack core 10 that attach to the molded resin region 1 to strongly adhere the battery pack core 10 and the molded resin region 1. However, a primer layer is not always required for the battery pack core, which can be insert molded and fixed in the molded resin region without applying primer. In the fabrication process that forms the molded resin region 1, a battery pack core 10 with primer applied is strongly adhered to the molded resin region 1. In particular, a primer layer can be provided to strongly adhere the molded resin region 1 to metal surfaces of the battery 2. Primer applied to the circuit board 3, and to the connector 9 and protection devices 8 attached to the surface of the circuit board 3 firmly adheres them to the molded resin region 1. A primer layer is applied to surfaces that attach to the molded resin region 1. The primer layer is a liquid primer solution in the unhardened state and can be sprayed, applied with a brush, or the battery pack core 10 can be dipped in the primer solution. The primer layer can be provided on necessary parts of the battery pack core 10 as a unit, or it can be applied to battery surfaces, the circuit board 3, protection devices 8, and the connector 9 before assembling the battery pack core 10. A primer layer provided on the surface of the connector 9 is applied to regions excluding electrical contacts such as the flexible contacts 22. This is because the primer layer can be a cause of poor electrical contact. Since the primer layer has an adequate effect as a thin layer, layer thickness is made ~1 μm. However, primer layer thickness can also be made from 0.5 μm to 5 μm. Since the primer layer serves to protect battery surfaces as well as strengthening adhesion of the molded resin region 1, layer thickness can be increased to improve its protective properties.

The molded resin region 1 of the battery pack can be formed from polyamide resin, and the primer layer can be an epoxy resin type primer. In the polyamide molded resin region 1, epoxy radicals in the primer layer introduced into acid amide bonds in the resin chemically bond in the primer layer. Therefore, the molded resin region 1 is strongly adhered to the primer layer. Instead of, or in addition to epoxy resin primer, other primers such as denatured epoxy resin type primer, phenol resin type primer, denatured phenol resin type primer, polyvinyl butyl resin type primer, and polyvinyl formal resin type primer can also be used. A plurality of these primers mixed together can also be used. These types of primers chemically bond with the polyamide molded resin region 1, and they form hydrogen bonds or chemically bond with metal surfaces to strongly adhere the molded resin region 1 to battery surfaces.

The synthetic resin used to form the molded resin region 1 is polyamide resin. Epoxy resin can also be added to the polyamide resin. Compared with polyamide resin only, polyamide resin with epoxy resin added has stronger adhesion. Since polyamide resin becomes pliable at a low temperature and has low viscosity in the molten state, it can be molded at lower temperatures and pressures than other thermoplastic synthetic resins. Further, it has the characteristic that it can be quickly ejected from the mold cavity. A molded resin region 1 that is formed at low temperature and pressure has the characteristic that molding time can be reduced, and the detrimental effects of heat and injection pressure during molding on elements such as the protection devices 8 can be reduced. However, the resin for forming the molded resin region 1 is not limited to polyamide resin. For example, resins other than polyamide, such as polyurethane can also be used. Further, if the ability of the protection devices 8 to withstand high temperature is improved, other thermoplastic resins such as polyethylene, acrylic, and polypropylene can also be used.

The molded resin region 1 is provided with a thin band 1a established around the perimeter of the sealing cap 11 and extending to the surface of the external case 11 of the battery 2. The thin band 1a is formed as a single piece with the molded resin region 1, and is attached to the surface of the perimeter of the battery 2 when the molded resin region 1 is formed. As shown in FIG. 4, molten resin injected into the cavity 31 of the mold 30 injects from around the perimeter of the sealing cap 11 into the region that forms the thin band 1a. This forms the molded resin region 1 and thin band 1a as a single piece. The thin band 1a is preferably formed around the entire perimeter of the sealing cap 11. This molded resin region 1, which has a thin band 1a provided around the entire perimeter of the sealing cap 11, is joined to the battery in a fashion most unlikely to delaminate. However, the thin band can also be provided along one part of the battery perimeter. For example, the thin band 1a can be provided only along the wide surfaces of a thin outline battery.

The width of the thin band 1a can be increased to increase battery attachment strength. Even if the thin band 1a is made relatively narrow, the molded resin region 1 can be strongly adhered to the battery 2. In particular, in a battery pack with a covering sheet (not illustrated) attached to the metal surfaces of the battery 2, the covering sheet can press the thin band 1a against the battery surfaces in a manner that keeps it from delaminating. Consequently, the thin band 1a can be made narrow and still securely attach the molded resin region 1 to the battery 2. The width of the thin band 1a can be 0.1 mm to 2 mm, preferably 0.2 mm to 1 mm, and for example, can be 0.5 mm. With a narrow thin band 1a, molten synthetic resin can be reliably injected into the thin band 1a region of the mold 30 and the specified shape can be molded.

The covering sheet is heat shrink tubing that contracts with heat. This covering sheet is tightly attached to the surface of the thin band 1a of the molded resin region 1 to securely join the molded resin region 1 to the battery 2. Further, in a battery pack covered by a covering sheet, things that are a source of delamination cannot ingress between the thin band 1a and the battery 2. In this respect as well, the covering sheet can prevent the thin band 1a from delaminating from the battery 2. Labeling and adhesive tape can also be used as a covering sheet. For a covering sheet that is labeling or adhesive tape, it attaches from the molded resin region and surface of the thin band to the battery surface, and securely joins the molded resin region to the battery.

As shown in FIG. 1, a step 24 is established around the perimeter of the molded resin region 1 of the battery pack, and the covering sheet can cover the thinly formed region of the step 24. In this molded resin region 1, the covering sheet does not protrude out from the molded resin region 1, and the surface of the molded resin region 1 and the surface of the covering sheet can be in approximately the same plane.

In the battery pack of FIG. 1, a molded plastic piece 23, which is formed separately from the molded resin region 1 is attached to the opposite end relative to the sealing cap 11, which has the molded resin region 1 attached. Specifically, the molded plastic piece 23 is attached to the bottom surface of the external case 2A of the battery 2. The molded plastic piece 23 is formed from plastic that is harder than the molded resin region 1. This molded plastic piece 23 is formed as a single piece with a bottom 23A that covers the entire bottom surface of the external case 2A and a second thin band 23a that extends from the bottom surface of the external case 2A to the outer surfaces of the battery 2. The bottom 23A is formed thicker than the second thin band 23a.

The battery pack described above is manufactured by the following steps.

(1) Battery Pack Core Assembly Step

In this step, the insulating cover 4 is disposed on the sealing cap 11 of the battery 2 in a manner that covers the exhaust outlet 13 of the safety valve 12 provided on the sealing cap 11 of the battery 2. The lead plate 5A, which is connected to the protruding electrode 2B by spot welding, is disposed on the insulating cover 4. The lead plate 5A is joined to the circuit board 3 by soldering. The projection 15 on the insulating cover 4 is passed through the through-hole 16 in the lead plate 5A to connect the lead plate 5A on the insulating cover 4 in a fixed position. Another lead plate 5B is connected to the sealing cap 11 of the battery 2 by spot welding, and the other end of this lead plate 5B is connected to the circuit board 3. The lead plates 5 and circuit board 3 are joined to the battery 2 to form the battery pack core 10. Protection devices 8 and a connector 9 are connected on the circuit board 3. A primer layer can be provided to parts of the battery pack core 10 where the molded resin region 1 attaches to increase attachment strength of the molded resin region 1. However, since it is not always necessary to provide a primer layer, the primer layer application step can also be omitted.

(2) Holding Step

The assembled battery pack core 10 is mounted and secured in the cavity 31 of the mold 30 that forms the molded resin region 1. Here, the battery pack core 10 is secured in the mold cavity 31 in a manner that will avoid any shift in position. Specifically, to retain the battery pack core 10 mounted in the mold cavity 31 in a fixed position, the entire outer surface of the battery 2 is sandwiched to maintain its position. In addition, the circuit board 3 is retained in a fixed position via retaining pins (not illustrated) that extend from the mold 30 into the mold cavity 31. Further, the securing pin 32 provided in the mold 30 presses the projection 15 on the insulating cover 4 towards the surface of the battery 2 via the intervening circuit board 3. This presses the insulating cover 4 against the surface of the battery 2. In the battery pack of FIG. 4, the perimeter edge of the insulating cover 4 is pressed against the end of the protruding ridge 14 provided around the perimeter of the battery 2. In the battery pack of FIG. 5, the insulating cover 54, which is pressure fit inside the protruding ridge 14, is pressed against the surface of the sealing cap 11. In this manner, the insulating cover 4, 54, with its projection 15 pressed upon by the securing pin 32, is tightly attached to the surface of the battery 2. This arrangement is maintained through the next step, which is the resin injection step. Consequently, even in the next resin injection step, the insulating cover 4 is retained in tight contact with the surface of the battery 2.

(3) Resin Injection Step

The mold 30 is closed and sealed with the battery pack core 10 secured in the mold cavity 31, and molten synthetic resin is injected into the mold cavity 31. Synthetic resin injected into the mold cavity 31 forms the molded resin region 1. The molded resin region 1 formed in the mold cavity 31 has the circuit board 3, lead plates 5, and insulating cover 4 inserted. The molded resin region 1 exposes part of the connector 9, which is mounted on the circuit board 3, to the outside. In addition, the thin band 1a attached around the perimeter of the battery 2 is also formed. Further, one part of the molded plastic piece can also be inserted in the molded resin region.

(4) Mold Ejection Step

After the molten synthetic resin injected into the mold cavity 31 has cooled and hardened, the mold 30 is opened and the battery pack is ejected from the mold 30. The battery pack ejected from the mold 30 has part of the battery pack core 10 inserted in the molded resin region 1 formed in the mold cavity 31 and the molded resin region 1 is tightly joined to the battery 2.

Finally, although not illustrated, the battery pack is inserted in a surface covering sheet, which is a cylindrical heat shrink tubing. Heat is applied to the heat shrink tubing to tightly attach it to the surface of the battery pack. The surface covering sheet tightly attaches to the surface of the thin band 1a of the molded resin region 1 and to the surface of the second thin band 23a of the molded plastic piece 23. This solidly connects the molded resin region 1 and the molded plastic piece 23 to the battery 2.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2006-324649 filed in Japan on Nov. 30, 2006, the content of which is incorporated herein by reference.

What is claimed is:

1. A method for manufacturing a battery pack, the method comprising:
  assembling a battery pack core by disposing an insulating cover on a battery which includes a safety valve, wherein the insulating cover is disposed on a surface of the battery and covers an exhaust outlet of the safety valve;
  temporarily holding the battery pack core in a mold that forms a molded resin region;
  closing a cavity of the mold that holds the battery pack core;
  injecting synthetic resin into the closed cavity of the mold; and
  ejecting the molded battery pack from the cavity of the mold to configure the battery pack with the battery pack core inserted in the molded resin region,
  wherein in the resin injection step,
  a securing pin of the mold is disposed inside the cavity, the securing pin protruding towards the insulating cover from an inner surface of the cavity, the inner surface of the cavity facing the surface of the battery,
  a projection of the insulating cover is protruded towards the inner surface of the cavity of the mold, the securing pin in the mold presses the insulating cover via the projection of the insulating cover in a direction putting the insulating cover in contact with the surface of the battery covering the exhaust outlet of the safety valve, and the synthetic resin is injected into the cavity of the mold in a pressed configuration.

2. The method for manufacturing the battery pack as recited in claim 1 wherein in the battery pack core assembly step, a lead plate is disposed on the insulating cover; a metal plate provided with a through-hole for inserting the projection on the insulating cover is used as the lead plate; and the projection on the insulating cover is inserted through the through-hole in the lead plate to dispose the lead plate on the insulating cover.

3. The method for manufacturing the battery pack as recited in claim 1, wherein in the battery pack core assembly step, a circuit board is disposed on the projection of the insulating cover; and in the resin injection step, the mold presses the insulating cover via the circuit board to press the insulating cover tightly in contact with the surface of the battery while the synthetic resin is injected into the mold cavity.

4. The method for manufacturing the battery pack as recited in claim 3, wherein in the battery pack core assembly step, a circuit board with a test point established on a front surface thereof is used as the circuit board disposed on the insulating cover; the test point is provided on an externally exposed region that is on the front surface of the circuit board opposite a pressure region on a backside of the circuit board that presses against the projection on the insulating cover;

in the resin injection step, the externally exposed region provided with the test point of the circuit board is pressed by the securing pin in the mold; the securing pin presses the externally exposed region of the circuit board and the pressure region of the circuit board in turn contacts and presses the projection on the insulating cover to secure the circuit board and the insulating cover in fixed positions in the mold cavity for molded resin region formation; and the securing pin that holds the circuit board and insulating cover in fixed positions forms a test window in the molded resin region that opens the externally exposed region to the outside.

5. The method for manufacturing the battery pack as recited in claim 4, wherein in the resin injection step, the securing pin that holds the circuit board and the insulating cover in fixed positions forms a test window in the molded resin region, wherein the test window is positioned over the exhaust outlet of the safety valve so as to open the externally exposed region to the outside.

6. The method for manufacturing the battery pack as recited in claim 1, wherein in the battery pack core assembly step, a circuit board with a test point provided on a front surface is used as a circuit board disposed on the insulating cover.

7. The method for manufacturing the battery pack as recited in claim 1, wherein the projection is positioned opposite the exhaust outlet of the safety valve.

8. The method for manufacturing the battery pack as recited in claim 1, wherein the exhaust outlet of the safety valve is opened in a sealing cap which forms an end plane of the battery, and wherein the projection has a long narrow lateral cross-section which extends in the lengthwise direction of the sealing cap.

9. The method for manufacturing the battery pack as recited in claim 8 wherein a lead plate is disposed on the insulating cover; a metal plate provided with a slit-shaped through-hole for inserting the projection on the insulating cover is used as the lead plate; and the battery pack core is made by inserting the projection on the insulating cover through the through-hole in the lead plate to dispose the lead plate on the insulating cover.

10. The method for manufacturing the battery pack as recited in claim 8, wherein in the battery pack core assembly step, the insulating cover is attached to the battery via double sided adhesive tape.

11. The method for manufacturing the battery pack as recited in claim 10, wherein the double sided adhesive tape will delaminate to exhaust gas to the outside when the safety valve opens.

\* \* \* \* \*